(12) United States Patent
Peddinti et al.

(10) Patent No.: US 10,606,907 B1
(45) Date of Patent: Mar. 31, 2020

(54) INTERACTIVE BROWSABLE CONTENT ITEMS

(71) Applicant: Google Inc., Mountain View, CA (US)

(72) Inventors: Raghava Viswa Mani Kiran Peddinti, Sunnyvale, CA (US); Lakshmi Kumar Dabbiru, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 879 days.

(21) Appl. No.: 15/170,288

(22) Filed: Jun. 1, 2016

Related U.S. Application Data

(60) Provisional application No. 62/304,736, filed on Mar. 7, 2016.

(51) Int. Cl.
| | | |
|---|---|---|
| G06F 17/30 | (2006.01) |
| G06F 16/9535 | (2019.01) |
| G06F 3/0488 | (2013.01) |
| G06F 3/0484 | (2013.01) |
| G06F 3/0482 | (2013.01) |
| G06Q 30/06 | (2012.01) |
| G06F 16/248 | (2019.01) |

(52) U.S. Cl.
CPC ........ *G06F 16/9535* (2019.01); *G06F 3/0482* (2013.01); *G06F 3/0488* (2013.01); *G06F 3/04842* (2013.01); *G06F 16/248* (2019.01); *G06Q 30/0623* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 2004/0117353 A1* | 6/2004 | Ishag | G06Q 30/0601 |
| 2013/0054569 A1* | 2/2013 | Mo | G06Q 30/02 |
| | | | 707/722 |
| 2015/0067556 A1* | 3/2015 | Tibrewal | G06F 16/285 |
| | | | 715/765 |
| 2017/0083171 A1* | 3/2017 | Nelson | G06F 3/0482 |

* cited by examiner

*Primary Examiner* — Anhtai V Tran
(74) *Attorney, Agent, or Firm* — Foley & Lardner LLP

(57) ABSTRACT

Interactive browsable content items can be used to browse and explore through content items responsive to a search query. A content item selection system can receive a search query and generate a result set identifying a plurality of products that define an n-dimensional space of the products. Pivot points are selected for the n-dimensional space to provide distinct products representative of the entire n-dimensional space. The pivot points are displayed in the interactive browsable content item on the client device. A subset of similar products are selected from the n-dimensional space of products responsive to the selection of a pivot point and displayed on the client device. Responsive to a zoom out touch input, a new set of pivot points are selected based on the prior selected pivot point.

19 Claims, 6 Drawing Sheets ated INTERACTIVE BROWSABLE CONTENT ITEMS

CROSS-REFERENCE TO RELATED PATENT APPLICATIONS

This application claims priority from Provisional Application U.S. Application 62/304,736, filed Mar. 7, 2016, incorporated herein by reference in its entirety.

BACKGROUND

In a networked environment, such as the Internet or other networks, first-party content providers can provide information for public presentation on resources, for example webpages, documents, applications, and/or other resources. The first-party content can include text, video, and/or audio information provided by the first-party content providers via, for example, a resource server for presentation on a client device over the Internet. The first-party content may be a webpage requested by the client device or a stand-alone application (e.g., a video game, a chat program, etc.) running on the client device. Additional third-party content can also be provided by third-party content providers for presentation on the client device together with the first-party content provided by the first-party content providers. For example, the third-party content may be a public service announcement or advertisement that appears in conjunction with a requested resource, such as a webpage (e.g., a search result webpage from a search engine, a webpage that includes an online article, a webpage of a social networking service, etc.) or with an application (e.g., an advertisement within a game). Thus, a person viewing a resource can access the first-party content that is the subject of the resource as well as the third-party content that may or may not be related to the subject matter of the resource.

SUMMARY

Implementations described herein relate to interactive browsable content items to browse and explore through content items responsive to a search query. A content item selection system can receive a search query and generate a result set identifying a plurality of products that define an n-dimensional space of the products. Pivot points are selected for the n-dimensional space of the products that provide distinct products representative of the entire n-dimensional space. Display data indicative of the pivot points can be served to a client device to displayed in the interactive browsable content item. A pivot point can be selected and a subset of similar products are selected from the n-dimensional space of products to be displayed in the interactive browsable content item. A user may select a product of the subset of products and be redirected to a landing page for the product and/or may directly purchase the selected product. If a user backs out of the subset of products, such as through a zoom out touch input, then a new set of pivot points are selected based on the prior selected pivot point. In implementations where each pivot point and/or subset of products is associated with revenue, such as ads, the new set of pivot points can increase such revenue.

One implementation relates to a method for providing interactive browsable content items. The method includes receiving a search query returning a result set identifying a plurality of products. The result set defines an n-dimensional space of the plurality of products. The method includes selecting a first plurality of pivot points based on the n-dimensional space of products. Each of the plurality of pivot points corresponds to a product of the n-dimensional space of products and each of the first plurality of pivot points is selected based on a dimensional distance within the n-dimensional space of products relative to another pivot point of the first plurality of pivot points. The method also includes serving display data indicative of the first plurality of pivot points to be displayed on a display of a client device. The method further includes receiving a touch input from the client device selecting a pivot point of the first plurality of pivot points. The method includes selecting a subset of the plurality of products from the n-dimensional space responsive to the selected pivot point and serving display data indicative of the subset of the plurality of products to be displayed on the display of the client device. The method still further includes receiving a zoom out touch input from the client device and, responsive to the zoom out touch input, selecting a second plurality of pivot points based on the n-dimensional space of products and the selected pivot point. The method yet further includes serving display data indicative of the second plurality of pivot points to be displayed on the display of the client device.

In some implementations, the display data indicative of the first plurality of pivot points is displayed in a single slot of a resource on the display of the client device. In some implementations, the resource is a search results page or an application executing on the client device. In some implementations, the touch input is a tap touch input or a zoom in touch input. In some implementations, each of the subset of the plurality of products are selected based on a probability exploration rate, where the probability exploration rate indicative of a likelihood of selection by a user based on the search query and the selected pivot point. In some implementations, the method further includes removing the subset of the plurality of products from the n-dimensional space of products. In some implementations, the first plurality of pivot points are further selected based on a bid amount.

Another implementation relates to a system for providing interactive browsable content items. The system may include one or more processors and one or more storage devices. The one or more storage devices includes instructions that cause the one or more processors to perform several operations. The operations include receiving a search query returning a result set identifying a plurality of products. The result set defines an n-dimensional space of the plurality of products. The operations include selecting a first plurality of pivot points based on the n-dimensional space of products. Each of the plurality of pivot points corresponds to a product of the n-dimensional space of products and each of the first plurality of pivot points is selected based on a dimensional distance within the n-dimensional space of products relative to another pivot point of the first plurality of pivot points. The operations also include serving display data indicative of the first plurality of pivot points to be displayed on a display of a client device. The operations further include receiving a touch input from the client device selecting a pivot point of the first plurality of pivot points. The operations include selecting a subset of the plurality of products from the n-dimensional space responsive to the selected pivot point and serving display data indicative of the subset of the plurality of products to be displayed on the display of the client device. The operations still further include receiving a zoom out touch input from the client device and, responsive to the zoom out touch input, selecting a second plurality of pivot points based on the n-dimensional space of products and the selected pivot point. The operations yet further include serving display data indicative of the second plurality of pivot points to be displayed on the display of the client device.

In some implementations, the display data indicative of the first plurality of pivot points is displayed in a single slot of a resource on the display of the client device. In some implementations, the resource is a search results page or an application executing on the client device. In some implementations, the touch input is a tap touch input or a zoom in touch input. In some implementations, each of the subset of the plurality of products are selected based on a probability exploration rate, where the probability exploration rate indicative of a likelihood of selection by a user based on the search query and the selected pivot point. In some implementations, the operations further include removing the subset of the plurality of products from the n-dimensional space of products. In some implementations, the first plurality of pivot points are further selected based on a bid amount.

Yet a further implementation relates to a computer readable storage device storing instructions that, when executed by one or more processors, cause the one or more processors to perform several operations. The operations include receiving a search query returning a result set identifying a plurality of products. The result set defines an n-dimensional space of the plurality of products. The operations include selecting a first plurality of pivot points based on the n-dimensional space of products. Each of the plurality of pivot points corresponds to a product of the n-dimensional space of products and each of the first plurality of pivot points is selected based on a dimensional distance within the n-dimensional space of products relative to another pivot point of the first plurality of pivot points. The operations also include serving display data indicative of the first plurality of pivot points to be displayed on a display of a client device. The operations further include receiving a touch input from the client device selecting a pivot point of the first plurality of pivot points. The operations include selecting a subset of the plurality of products from the n-dimensional space responsive to the selected pivot point and serving display data indicative of the subset of the plurality of products to be displayed on the display of the client device.

In some implementations, the display data indicative of the first plurality of pivot points is displayed in a single slot of a search results page on the display of the client device. In some implementations, each of the subset of the plurality of products are selected based on a probability exploration rate, where the probability exploration rate indicative of a likelihood of selection by a user based on the search query and the selected pivot point. In some implementations, the operations further include removing the subset of the plurality of products from the n-dimensional space of products. In some implementations, the operations further include receiving a zoom out touch input from the client device, selecting a second plurality of pivot points based on the n-dimensional space of products and the selected pivot point responsive to the zoom out touch input, and serving display data indicative of the second plurality of pivot points to be displayed on the display of the client device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
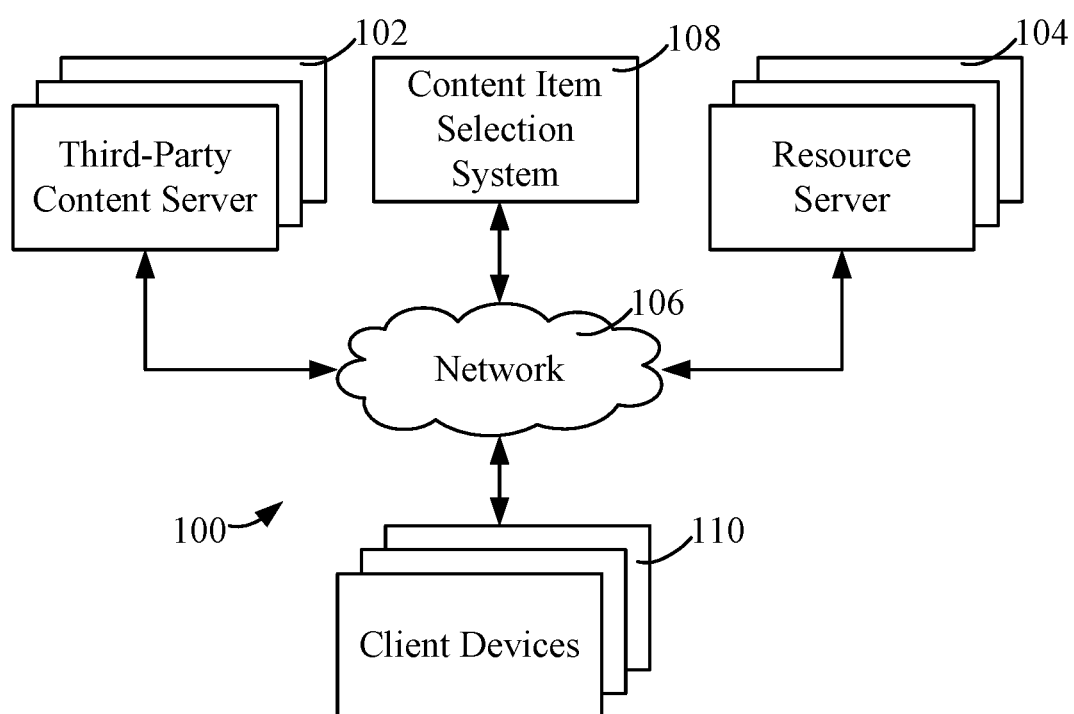
FIG. 1 is an overview depicting an implementation of a system of providing information via a computer network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

A computing device (e.g., a client device) can view a resource, such as a webpage, a document, an application, etc. In some implementations, the computing device may access the resource via the Internet by communicating with a server, such as a webpage server, corresponding to that resource. The resource includes first-party content that is the subject of the resource from a first-party content provider and may also include additional third-party provided content, such as advertisements or other content. In one implementation, responsive to receiving a request to access a webpage, a webpage server and/or a client device can communicate with a data processing system, such as a content item selection system, to request a content item to be presented with the requested webpage, such as through the execution of code of the resource to request a third-party content item to be presented with the resource. The content item selection system can select a third-party content item and provide data to effect presentation of the content item with the requested webpage on a display of the client device. In some instances, the content item is selected and served with a resource associated with a search query response. For example, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. In one implementation, responsive to use of the application, a resource server and/or a client device can communicate with a data processing system, such as a content item selection system, to request a content item to be presented with a user interface of the application and/or otherwise. The content item selection system can select a third-party content item and provide data to effect presentation of the content item with the application on a display of the client device.

In some instances, a device identifier may be associated with the client device. The device identifier may be a randomized number associated with the client device to identify the device during subsequent requests for resources and/or content items. In some instances, the device identifier may be configured to store and/or cause the client device to transmit information related to the client device to the content item selection system and/or resource server (e.g., values of sensor data, a web browser type, an operating system, historical resource requests, historical content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for presentation with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other examples, a third-party content provider may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system uses content item interaction data to determine the performance of the third-party content provider's content items. For example, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, one or more performance metrics for the third-party content items may be determined and indications of such performance metrics may be provided to the third-party content provider via a user interface for the content item management account. For example, the performance metrics may include a cost per impression (CPI) or cost per thousand impressions (CPM), where an impression may be counted, for example, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used.

In some instances, a webpage or other resource (such as, for example, an application) includes one or more content item slots in which a selected and served third-party content item may be displayed. The code (e.g., JavaScript®, HTML, etc.) defining a content item slot for a webpage or other resource may include instructions to request a third-party content item from the content item selection system to be presented with the webpage. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system through an auction.

During an auction for a content item slot for a resource, such as a webpage, several different types of bid values may be utilized by third-party content providers for various third-party content items. For example, an auction may include bids based on whether a user clicks on the third-party content item, whether a user performs a specific action based on the presentation of the third-party content item, whether the third-party content item is selected and served, and/or other types of bids. For example, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For example, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or an normalized value, may be generated to be used in the auction based on the bid value and the probability or another modifying value. In the prior example, the value or score for a bid based on whether the third-party content item is selected and served may be $0.005*1.00=0.005 and the value or score for a bid based on whether a user performs a specific action may be $5*0.002=0.01. To maximize the income generated, the content item selection system may select the third-party content item with the highest value from the auction. In the foregoing example, the content item selection system may select the content item associated with the bid based on whether the user performs the specific action due to the higher value or score associated with that bid.

Once a third-party content item is selected by the content item selection system, data to effect presentation of the third-party content item on a display of the client device may be provided to the client device using a network.

In some instances, content items for one or more products are displayed responsive to a search query. For instance, a search query for "mobile phone" may result in a result set including webpages directed to mobile phones as well as content items representative of one or more sponsored products to be displayed with the result set. The content items may be displayed in one or more content item slots. In some instances, a fixed number of content items are displayed, which limits the potential exploration of content items by a user of a client device. Thus, providing a content item slot with interactive browsable content items may permit a user of a client device to explore various sponsored products prior to selection and redirection to a corresponding landing page for the content item. Described herein are systems and methods of alternatively displaying and interacting with results to allow a user to browse different items (e.g., different types of products) prior to drilling down to specific results or products.

Shopping for various products provides a unique challenge of satisfying the needs to have both a searching experience for users looking to inform what kind of product they are looking for and a browsing experience for the user to browse similar types of products once the user has decided on the kind of product they are interested in. In search advertising, it may be difficult to create an experience that caters to both the searching and browsing experience. Current implementations provided to users only offer the searching experience responsive to a search query and/or browsing using filters.

New interactive browsable content items not only permit a user to be presented with content items responsive to a search query, but also permit the user to intuitively browse through the content items using touch inputs to explore similar products based on pivot points. Touch inputs such as pinching in or out (e.g., to zoom in or out) and swiping left or right provides both a searching and browsing experience for displaying content items and allowing a user to select a corresponding content item to be redirected to a landing page.

Shopping for products can be defined as a problem of navigating a n-dimensional grid with products and offers lined across the n-dimensional grid. The various attributes of the products form the dimensions of the grid (e.g., for a mobile phone, the phone size, phone color, phone type, phone manufacturer, etc. are the various attributes). As noted above, some implementations utilize selection of attribute filters like price, color, size, etc to filter the product results. However, such strict filtering may eliminate products that are similar to a product of interest to the user, but is excluded based on the attribute filter. Other implementations provide a browsing experience where users navigate through sections (e.g., product trees) and often encounter products that are similar to the kinds of products that a user is searching for, but may not be preferred by the user.

The new interactive browsable content items utilize pivot points (e.g., selected products and/or categories of products) based on the n-dimensional space of products to provide a variety of distinct products and/or categories of products for a user to navigate through the n-dimensional grid. When a pivot point is selected, the corresponding point in the n-dimensional space of products is utilized to generate a subset of products through which the user may explore for products similar to the selected pivot point.

In brief, the process of presenting the interactive browsable content items and receiving interactions from a user of a client device to select and serve pivot points and subsets of products includes receiving, by a content selection system, a search query returning a result set identifying a plurality of products that define an n-dimensional space of the plurality of products.

A first plurality of pivot points are selected from the n-dimensional space of products. The first plurality of pivot points may be selected based on a distance of each pivot point to the other pivot points of the first plurality of pivot points (e.g., the attributes of the products may be quantized and a distance may be calculated between the products). In some implementations, the first plurality of pivot points may be selected based on interests of associated with a client identifier of the client device transmitting the search query (e.g., the interest may be identified based on prior search queries, based on prior selected content items, etc.). In some implementations, the first plurality of pivot points may be selected based on a combined bid for a particular content item and a predicted exploration value, as will be described in greater detail herein. The set of P pivot points are algorithmically chosen to cover the entire n-dimensional space and help a user navigate by providing different distinctive attributes of the products contained within the n-dimensional space.

Display data indicative of the first plurality of pivot points is transmitted to the client device to be displayed on a display of the client device. The display data can include images of a corresponding product for the pivot point and, in some implementations, text providing a name for a product or category of products for the pivot point. A user of the client device can swipe through the displayed pivot points, thereby changing which pivot points of the first plurality of pivot points are displayed.

When a user selects or zooms in on a pivot point, then data indicative of the selected pivot point is transmitted to the content selection server. Responsive to the selection, a new subset of results of products are selected from the n-dimensional space based on the selected pivot point. Display data for the subset of products are transmitted to the client device to be displayed by the display of the device where the user can select a particular displayed product offer. Responsive to the selection of the particular displayed product offer, the client device is redirected to a corresponding landing page for the selected product offer. In other implementations, the selection of the particular displayed product offer may result in a purchase of the product from a merchant. Alternatively, a user of the client device can zoom out (e.g., pinching in on a touchscreen display), which results in a second plurality of pivot points to be selected and display data indicative of the second plurality of pivot points to be transmitted to the client device. The second plurality of pivot points (and any subsequent pivot points) can be selected based on the browsing history through the prior selected pivot points. In some implementations, the subset of products can be filtered from the n-dimensional space and the second plurality of pivot points can be selected from the filtered n-dimensional space based on a similarity to the previously selected pivot point and the original search query.

By way of example, if a search query is "cell phones," then a first pivot could be set as "iPhone 6," the second pivot could be set as "Samsung Galaxy," and a third pivot could be set as "Blackberry," etc. to provide a high level of differentiation of the products that are responsive to the search query of "cell phones." Once the user selects a pivot point, then all the content items for products that are near the pivot point are selected for the set to be displayed to the user. For example, if user selects "iPhone 6," then the content items for products that are shown to the user may include those for "iPhone 6," "iPhone 5," "iPhone 6 black," etc. As the user continues to select pivot points, the products that are similar to all the pivot points previously selected are chosen. Thus, the system adapts to the user's trail of browsed products to display products with similar attributes to those selected by the user. Once the user "pinches out," then the most recent content items for products for that pivot point are forgotten and all products and offers near to the previously selected pivot are used to select the higher level products/pivots. Once the user selects one of the offers/products to take further action, then the advertiser is charged for that action.

The disclosed solution provided by an interactive browsable content items is particularly adapted to providing a better experience for shopping on mobile client devices based on the limited display area by uniquely combining both searching and browsing experiences by providing intuitive user interactions for a user of a mobile device to swipe through and/or zoom in/out of results that are responsive to the initial search query.

FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system, such as a content item selection system 108. The content item selection system 108 can include at least one logic device, such as a computing device having a data processor, to communicate via the network 106, for example with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect presentation of one or more content items to the resource server 104 and/or the client device 110. In addition to the processing circuit, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide web page data and/or other data to the client device 110, which causes visual indicia to be displayed by the display of the client device 110. Accordingly, the browser window displays the retrieved first-party content, such as web pages from various websites, to facilitate user interaction with the first-party content.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to effect presentation of a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for example, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a web page. The client device 110 may be a computing device operated by a user (represented by a device identifier), which, when accessing a resource of the resource server 104, can make a request to the content item selection system 108 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the content item selection system 108 receives can include a HyperText Transfer Protocol (HTTP) cookie which contains a device identifier (e.g., a random number) that represents the client device 110. In some implementations, the device information and/or the resource information may be appended to a content item request URL (e.g., contentitem.item/page/ contentitem?devid=abc123&devnfo=A34r0). In some implementations, the device information and/or the resource information may be encoded prior to being appended the content item request URL. The requesting device information and/or the resource information may be utilized by the content item selection system 108 to select third-party content items to be served with the requested resource and presented on a display of a client device 110.

In some instances, a resource of a resource server 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client device 110. The search results may include web page titles, hyperlinks, etc. One or more third-party content items may also be presented with the search results in a content item slot of the search result web page. Accordingly, the resource server 104 and/or the client device 110 may request one or more content items from the content item selection system 108 to be presented in the content item slot of the search result web page. The content item request may include additional information, such as the user device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For example, the third-party content provider may set bid values and/or selection criteria via a user interface that may include one or more content item conditions or constraints regarding the serving of content items. A third-party content provider may specify that a content item and/or a set of content items should be selected and served for user devices 110 having device identifiers associated with a certain geographic location or region, a certain language, a certain operating system, a certain web browser, etc. In another implementation, the third-party content provider may specify that a content item or set of content items should be selected and served when the resource, such as a web page, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

Figure 2B:
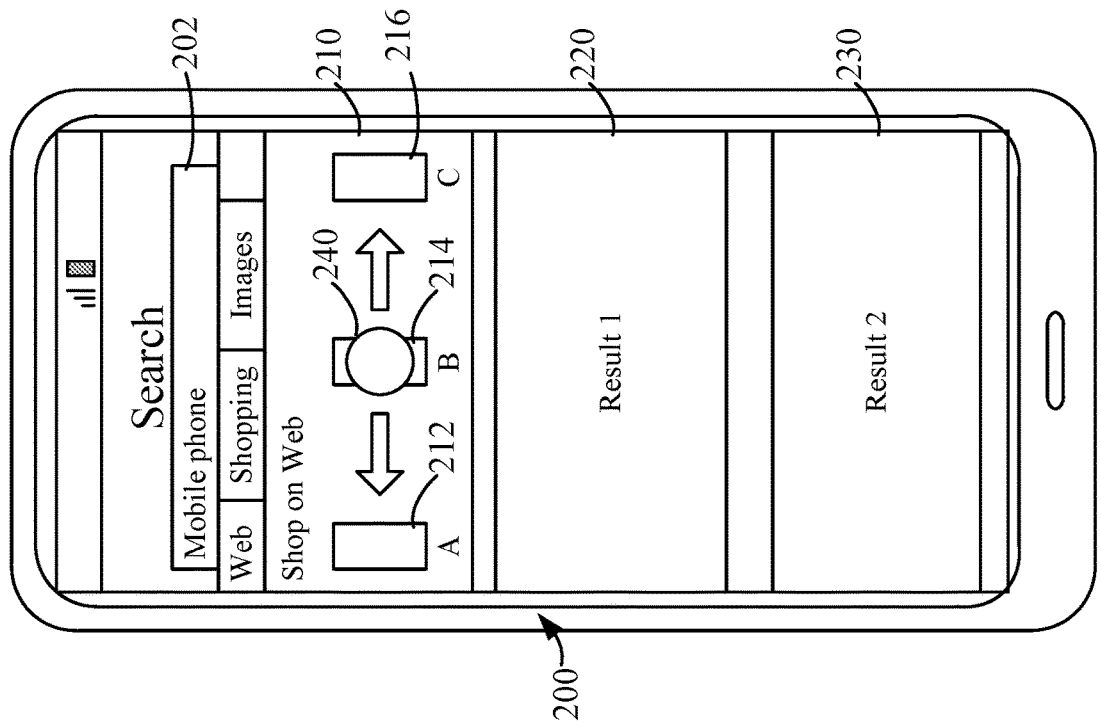
FIG. 2B is an overview depicting the search result page of FIG. 2A displaying interactive browsable results with a user inputting a swipe touch input to change the display of a plurality of pivot points.
Figure 2A:
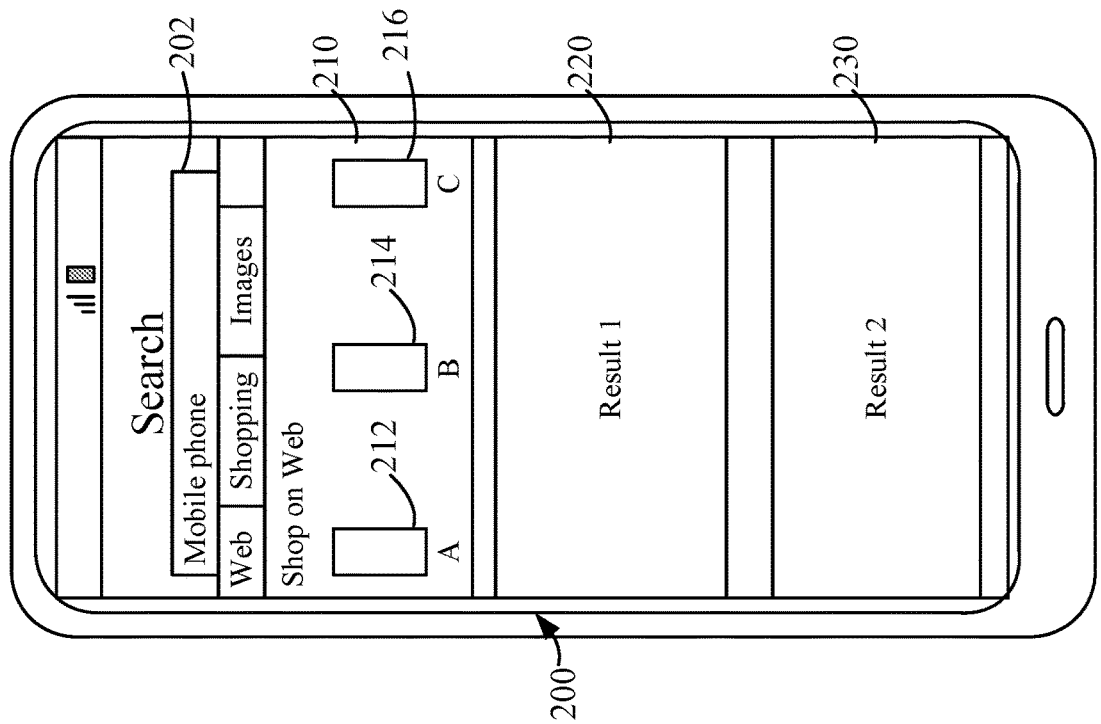
FIG. 2A is an overview depicting a search result page displaying interactive browsable results with a result set responsive to a search query.

FIG. 2A depicts a search result page 200 displayed on a display of a client device and having a content item slot 210 for displaying interactive browsable content items and results 220, 230 responsive to a search query. The search query may be entered into an entry field 202 and, when a selection button or other input is provided, the search query is transmitted to a content item selection system, such as content item selection system 108 of FIG. 1. Responsive to receiving the search query, the content item selection system determines a result set identifying a plurality of products that define an n-dimensional space of the plurality of products. A first plurality of pivot points are selected from the n-dimensional space of products and display data indicative of the first plurality of products is transmitted from the content item selection system to the client device. The client device displays the display data for one or more of the pivot points 212, 214, 216 in the content item slot 210. In some implementations, the content item slot 210 is a single interactive content item slot. The display data for one or more of the pivot points 212, 214, 216 may include an image of a corresponding product or category of product for the pivot point 212, 214, 216 and, in some implementations, text, such as a product name and/or category of product.

FIG. 2B depicts the search result page 200 of FIG. 2A displayed on the display of the client device and having a user inputting a swipe touch input 240 to change the display of the one or more of the pivot points 212, 214, 216. The swipe touch input 240 can be through a finger, stylus, or other item for interacting with a touchscreen display. The swipe touch input 240 can be a swipe to the left or right relative to the displayed one or more of the pivot points 212, 214, 216. When the swipe touch input 240 is to the left or right, the interactive browsable content item can scroll through display data for additional pivot points to be displayed in the content item slot. Thus, a user of the client device can swipe through display data for multiple pivot points 212, 214, 216 without needing to navigate away from the search result page 200. By swiping through the display data for multiple pivot points 212, 214, 216, various distinct products and/or categories of products can be displayed to a user of the client device to provide a browsing experience through the content item slot, thereby allowing a user to examine distinct products prior to selecting a pivot point to explore further, as discussed in reference to FIG. 2C.

Figure 2C:
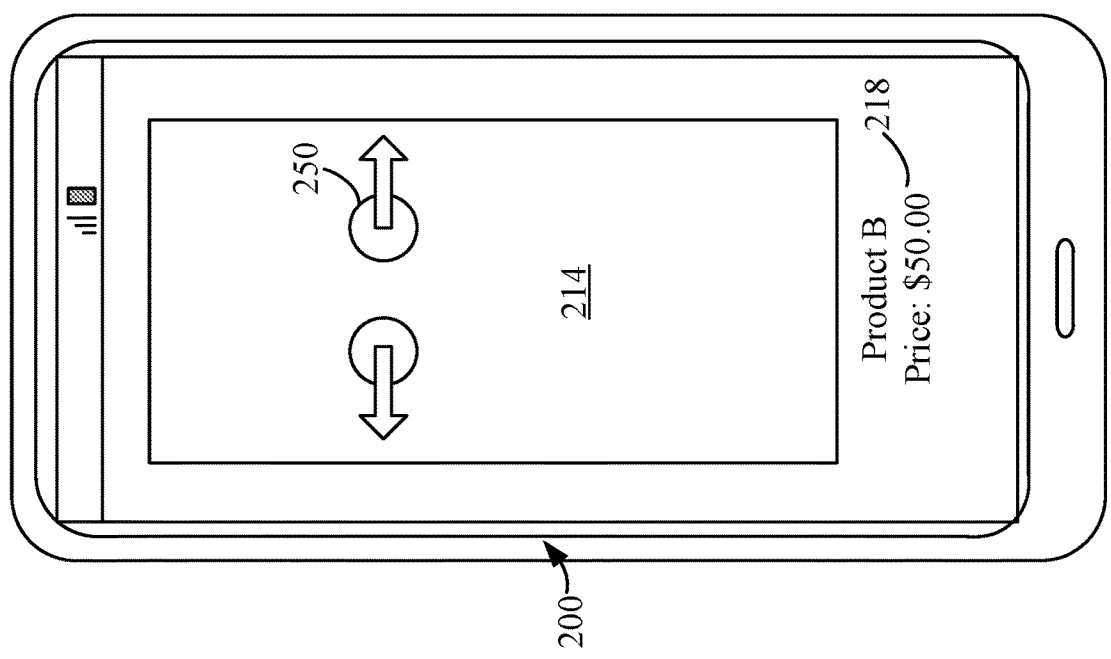
FIG. 2C is an overview depicting a full screen view of a product of the interactive browsable results with a user inputting a zoom in touch input to select a displayed pivot point.

FIG. 2C depicts a full screen view of a selected pivot point 214 displayed on the display of the client device and having a user inputting a zoom in touch input 250 to have a subset of products displayed based on the selected pivot point 214. In some implementations, a selection touch input (e.g., tapping or pressing on the pivot point 214) may also be used to select the displayed pivot point 214. The selected pivot point 214 may include product information 218, such as a name, price, specification details, etc. Responsive to a selection of the pivot point 214, the client device transmits data indicative of the selected pivot point 214 to the content item selection system. The content item selection system then selects a subset of products based on the selected pivot point (e.g., products similar to the selected pivot point) and transmits display data for the subset of products (e.g., content items) to the client device to be displayed in the content item slot 210. In some implementations, the display data for the subset of products may be displayed in a full screen mode for the client device (e.g., the content item slot expands to full screen).

Figure 3:
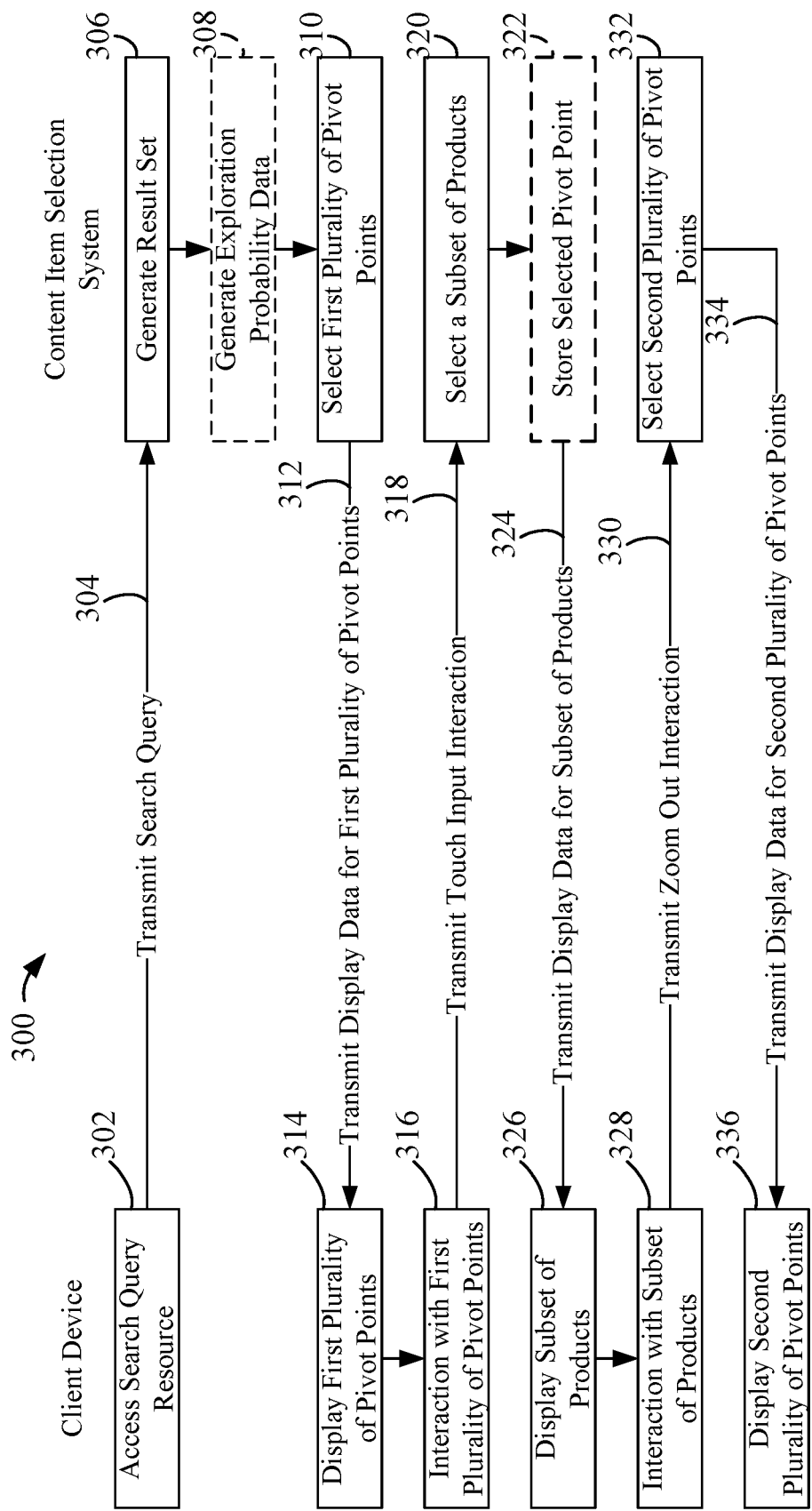
FIG. 3 is a process diagram depicting a process for providing interactive browsable content items to a client device.

FIG. 3 depicts a process 300 for providing interactive browsable content items to a client device. The process 200 includes a client device accessing a search query resource 302. The search query resource may be webpage displayed in a browser executing on the client device and/or may be an application executing on the client device. The process 300 includes transmitting the search query 304 to a content item selection system. Responsive to receiving the search query, the content item selection system generates a result set 306 identifying a plurality of products based on the search query. The result set defines an n-dimensional space of the plurality of products. The various attributes of the plurality of products form the dimensions of the n-dimensional space (e.g., for a mobile phone, the phone size, phone color, phone type, phone manufacturer, etc. are the various attributes).

In some implementations, the process 300 includes generating exploration probability data 308. The generation of exploration probability data 308 may occur offline and/or in real time responsive to generating the result set responsive to receiving the search query. The exploration probability data is generated based on historical exploration data and click data. That is, for a given search query and a selected product, what is the probability of exploration of a subsequent product of the n-dimensional space. The probability exploration rate may be defined as:

$$pER(\text{query}, \text{Product}_1, \text{Product}_2) = \% \text{ Probability}$$

where query is the search query, Product1 is a first selected product, Product2 is a second, subsequent selected product after selection of Product1, and % Probability is a decimal or percentage value of the likelihood of subsequent selection of Product2 after selection of Product1. In some implementations, the probability exploration rate may be done for multiple subsequent products (e.g., $pER(\text{query}, \text{Product}_1, \text{Product}_2, \text{product}_3)$) for the probability of a third subsequent selected product after selection of Product1 and Product2. Thus, the probability exploration rate is indicative of a likelihood of selection by a user based on the search query and one or more prior selected products. Such percentage probability data can be mined from search query and search result data, content item selection data, and/or any other source of data for selection of subsequent products.

For a given search query, an exploration probability graph (shown and described in greater detail in reference to FIG. 4) may be generated for all content items for the products of the n-dimensional space using the historical exploration and click data, predicted click-through-rate probabilities, calculated distances between products based on attributes of each product, and/or coverage numbers.

A first plurality of pivot points are selected 310 based on the n-dimensional space of products. Each of the plurality of pivot points corresponds to a product of the n-dimensional space of products. The first plurality of pivot points may be selected through an auction. In some implementations, the first plurality of pivot points may be selected based on a distance of each pivot point to the other pivot points of the first plurality of pivot points (e.g., the attributes of the products may be quantized and a distance may be calculated between the products) within the n-dimensional space of products. In some implementations, the first plurality of pivot points may be selected based on interests of associated with a client identifier of the client device transmitting the search query (e.g., the interest may be identified based on prior search queries, based on prior selected content items, etc.). In some implementations, the first plurality of pivot points may be selected based on a combined bid for a particular content item and a predicted exploration value from the exploration probability data. That is, each pivot point can be based, at least in part, on an expected cost of minimum exploration (ECME). The expected cost of minimum exploration may be calculated as:

$$ECME = SUM[pER(Query, Product_1) \times Bid_1 + pER(Query, Product_1, Product_2) \times Bid_2 + pER(Query, Product_1, Product_2) \times Bid_a + \ldots$$

where pER(Query, Product1) is the probability that Product1 is selected based on the search query (e.g., similar to a pCTR value), Bid1 is a bid value for a content item for Product1, pER(Query, Product1, Product2) is the probability that Product2 is selected after Product1 based on the search query, Bid2 is a bid value for a content item for Product2, pER (Query, Product1, Product3) is the probability that Product3 is selected after Product1 based on the search query, and Bid3 is a bid value for a content item for Product3. In some implementations, the ECME may be calculated for a predetermined minimum of exploration (e.g., a minimum of three products deep, such that pER(Query, Product1, Product2, Product3) is utilized) such that the sum is not an infinite summing process.

The set of P pivot points for the first plurality of pivot points are algorithmically chosen to cover the entire n-dimensional space and help a user navigate by providing different distinctive attributes of the products contained within the n-dimensional space.

Display data indicative of the first plurality of pivot points is transmitted or served 312 to the client device to be displayed on a display of the client device. The display data can include images of a corresponding product for the pivot point and, in some implementations, text providing a name for a product or category of products for the pivot point. In some implementations, the images, products, landing page references, etc. for the first plurality of pivot points may be pre-fetched and cached by the client device. In some further implementations, the images, products, landing page references, etc. for each subset of products for each of the first plurality of pivot points may also be pre-fetched and cached by the client device to reduce bandwidth consumption and/or increase responsiveness by not needing to communicate with the content item selection system responsive to an interaction. The client device displays the first plurality of pivot points 314 on a display of the client device. In some implementations, the first plurality of pivot points are displayed within a single content item slot of a search result page, such as search result page 200 of FIG. 2A. In other implementations, the first plurality of pivot points are displayed in a full screen mode on the display of the client device.

The process 300 includes the client device receiving an interaction, such as a touch input, with the first plurality of pivot points 316. In some implementations, the interaction may include a swipe touch input to browse through the display of the one or more of the pivot points. When the swipe touch input is to the left or right, the interactive browsable content item can scroll through display data for additional pivot points of the first plurality of pivot points to be displayed in the content item slot. Thus, a user of the client device can swipe through display data for multiple pivot points without needing to navigate away from a search result page.

In some instances, the interaction may include a selection touch input interaction, such as a tap or zoom in touch input, for a displayed pivot point. The selection touch input interaction is transmitted 318 to and received by the content item selection system with data indicative of the selected pivot point. Responsive to the selection, a subset of the plurality of products from the n-dimensional space are selected 320 based on the selected pivot point. In some implementations, each product of the subset of products is selected based on a probability exploration rate, pER, where the probability exploration rate is indicative of a likelihood of selection by a user based on the search query and the selected pivot point. In some implementations, the selected subset of products may be based on bids of one or more content items for a corresponding product of the subset. The subset of products may further be based on a predetermined number of products having the lowest calculated distance from the selected pivot point product.

In some implementations, the content item selection system stores the data indicative of the selected pivot point 322. The data indicative of the selected pivot point may be used to determine subsequent pivot points and/or to update the historical exploration data and click data for the exploration probability data.

Display data for the subset of the plurality of products is transmitted or served 324 to the client device and is displayed 326 by the display of the device. The process 300 includes an interaction by a user of the client device with the subset of products 328. In some instances, a user of the client device interacts with the subset of products by selecting a particular displayed product offer and, responsive to the selection of the particular displayed product offer, the client device is redirected to a corresponding landing page for the selected product offer. In other implementations, the selection of the particular displayed product offer may result in a purchase of the product from a merchant.

Alternatively, a user of the client device can interact with the subset of products 328 by providing a zoom out touch input (e.g., pinching in on a touchscreen display). The zoom out interaction is transmitted 330 to and received by the content item selection system and, responsive to the zoom out interaction, the content item selection system selects a second plurality of pivot points 332 based on the n-dimensional space of products and the selected pivot point. The second plurality of pivot points (and any subsequent pivot points) can be selected based on the browsing history through the prior selected pivot point(s). In some implementations, the subset of products can be filtered or removed from the n-dimensional space and the second plurality of pivot points are selected from the filtered n-dimensional space. The second plurality of pivot points may be based on a similarity to the previously selected pivot point and the original search query. In some implementations, second exploration probability data may be generated responsive to the zoom out touch input and the selected pivot point and the second plurality of pivot points may be selected based on the second exploration probability data.

Display data indicative of the second plurality of pivot points is transmitted or served 334 to the client device, and the client device displays the display data indicative of the second plurality of pivot points 336 on the display of the client device.

The process 300 may continue with a user of the client device interacting with the second plurality of pivot points similar to the interaction with the first plurality of pivot points 316. As multiple pivot points are selected and explored, the trail of exploration through pivot points is used to refine subsequent subsets of product and/or pivot points selected from the n-dimensional space of products such that a user is able to hone in on a particular product of interest without being limited by strict filtering.

Figure 4:
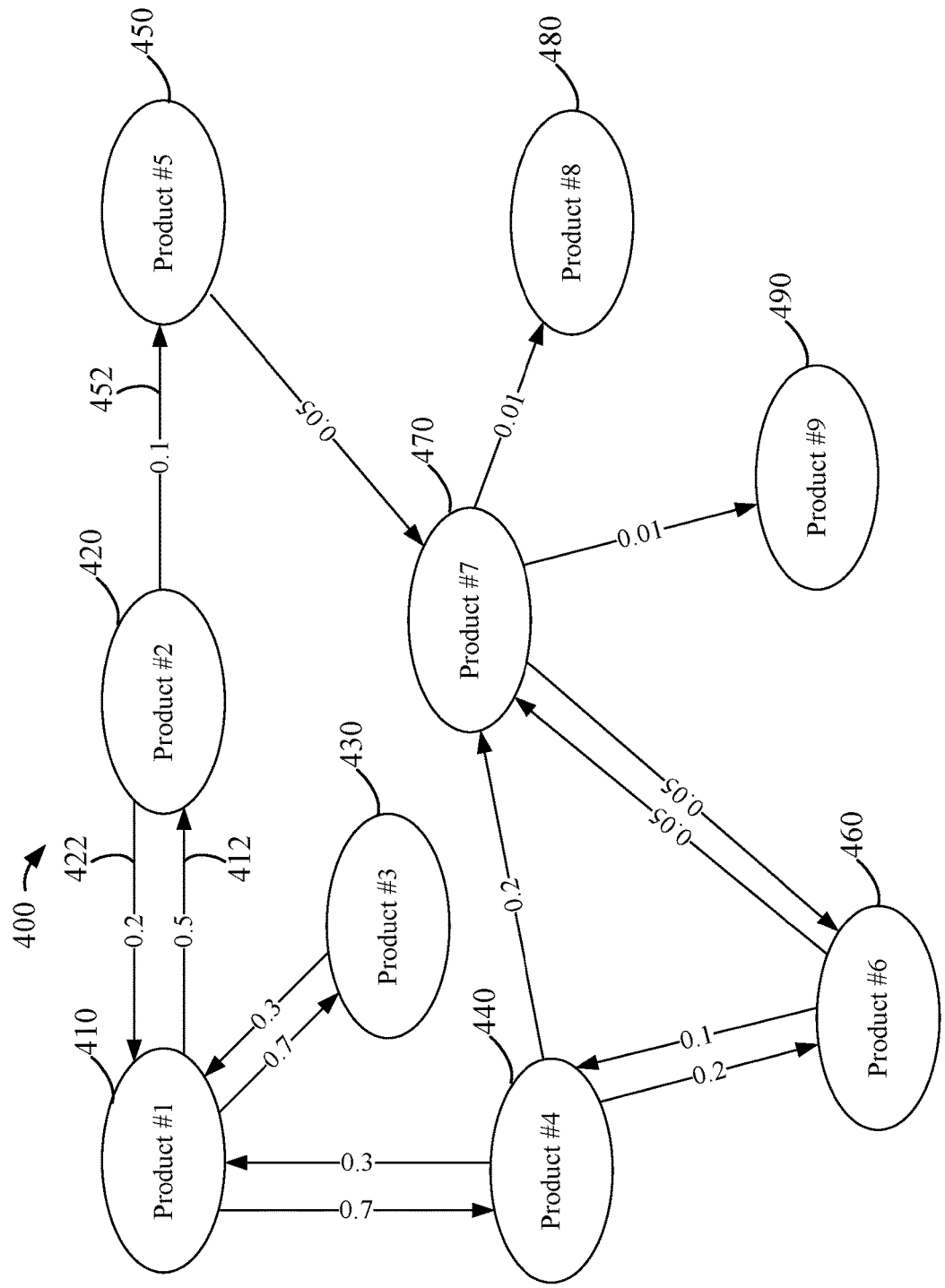
FIG. 4 is a graphical representation of a probability exploration for one or more products based on a search query.

FIG. 4 depicts a probability exploration graph 400 representative of the probability exploration data for one or more products based on a search query. The probability exploration graph 400 includes several products 410, 420, 430, 440, 450, 460, 470, 480, 490 and corresponding links 412, 422, 452 between products based on the probability exploration data. Each of the products 410, 420, 430, 440, 450, 460, 470, 480, 490 corresponds to a product of the n-dimensional space of products and may be associated with a corresponding content item for the product. The corresponding content item may further be associated with a bid value that can be used with the probability exploration rate to optimize revenue. The links 412, 422, 452 correspond to probability exploration rates between products based on the search query and the selection of product #1 initially. For instance, the probability exploration rate of link 412 from product #1 to product #2 is 0.5, or 50%. That is, for the search query and a selection of product #1 as a selected pivot point of the first plurality of pivot points, there is a 50% probability of a selection of product #2. Each link 412, 422, 452 is directional and represent an exploration path. Thus, link 422 is representative of a probability exploration rate from product #1 to product #2 and back to product #1. That is, for the search query and a selection of product #1 as a selected pivot point of the first plurality of pivot points, there is a 50% probability of a selection of product #2 and then a 20% probability of a selection of product #1 from product #2. Similarly, link 452 is representative of a probability exploration rate from product #1 to product #2 and then to product #5. That is, for the search query and a selection of product #1 as a selected pivot point of the first plurality of pivot points, there is a 50% probability of a selection of product #2 and then a 10% probability of a selection of product #5 from product #2. While the probability exploration graph 400 is a graphical depiction, the probability exploration data may be data stored in a data table that is accessed when determining the pivot points and/or subset of products from the n-dimensional space.

Figure 5:
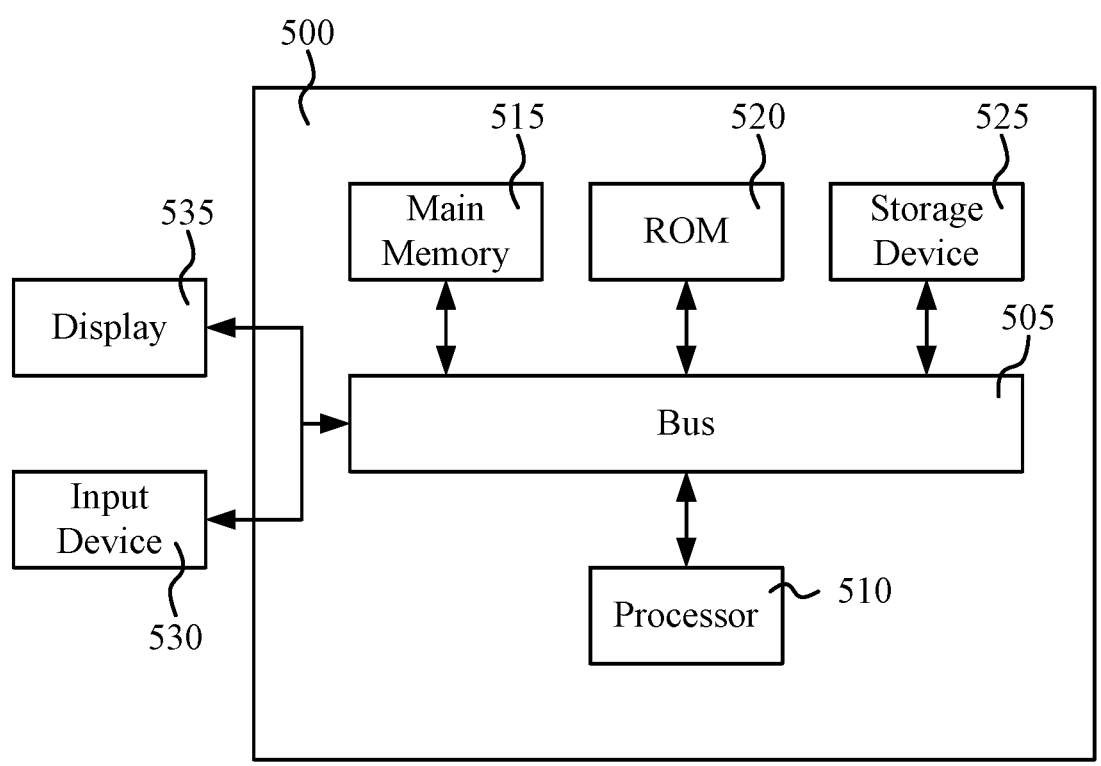
FIG. 5 is a block diagram depicting a general architecture for a computer system that may be employed to implement various elements of the systems and methods described and illustrated herein.

FIG. 5 is a block diagram of a computer system 500 that can be used to implement the client device 110, content item selection system 108, third-party content server 102, resource server 104, etc. The computing system 500 includes a bus 505 or other communication component for communicating information and a processor 510 coupled to the bus 505 for processing information. The computing system 500 can also include one or more processors 510 coupled to the bus for processing information. The computing system 500 also includes main memory 515, such as a RAM or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a ROM 520 or other static storage device coupled to the bus 505 for storing static information and instructions for the processor 510. A storage device 525, such as a solid state device, magnetic disk or optical disk, is coupled to the bus 505 for persistently storing information and instructions. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 500 may be coupled via the bus 505 to a display 535, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 530, such as a keyboard including alphanumeric and other keys, may be coupled to the bus 505 for communicating information and command selections to the processor 510. In another implementation, the input device 530 may be integrated with the display 535, such as in a touch screen display. The input device 530 can include a cursor control, such as a mouse, a trackball, or cursor direction keys, for communicating direction information and command selections to the processor 510 and for controlling cursor movement on the display 535.

According to various implementations, the processes and/or methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes and/or method steps described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an implementation of a computing system 500 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method for providing interactive browsable content items, the method comprising:
   receiving, by one or more data processors, a search query returning a result set identifying a plurality of products, the result set defining an n-dimensional space of the plurality of products;
   selecting, by the one or more data processors, a first plurality of pivot points based on the n-dimensional space of products, each of the plurality of pivot points corresponding to a product of the n-dimensional space of products, each of the first plurality of pivot points selected based on a dimensional distance within the n-dimensional space of products relative to another pivot point of the first plurality of pivot points;

serving, by the one or more data processors, display data indicative of the first plurality of pivot points to be displayed on a display of a client device;

receiving, by the one or more data processors, a touch input from the client device selecting a pivot point of the first plurality of pivot points;

selecting, by the one or more data processors, a subset of the plurality of products from the n-dimensional space responsive to the selected pivot point;

serving, by the one or more data processors, display data indicative of the subset of the plurality of products to be displayed on the display of the client device;

receiving, by the one or more data processors and subsequently to receiving the touch input and subsequently to serving the display data indicative of the subset of the plurality of products, a zoom out touch input from the client device;

selecting, by the one or more data processors and responsive to the zoom out touch input, a second plurality of pivot points based on the subset of the plurality of products and the selected pivot point, the second plurality of pivot points different from the first plurality of pivot points; and serving, by the one or more data processors, display data indicative of the second plurality of pivot points to be displayed on the display of the client device.

2. The method of claim 1, wherein the display data indicative of the first plurality of pivot points is displayed in a single slot of a resource on the display of the client device.

3. The method of claim 2, wherein the resource is a search results page.

4. The method of claim 2, wherein the resource is an application executing on the client device.

5. The method of claim 1, wherein the touch input is a tap touch input.

6. The method of claim 1, wherein the touch input is a zoom in touch input.

7. The method of claim 1, wherein each of the subset of the plurality of products are selected based on a probability exploration rate, the probability exploration rate indicative of a likelihood of selection by a user based on the search query and the selected pivot point.

8. The method of claim 1, further comprising:
removing the subset of the plurality of products from the n-dimensional space of products.

9. The method of claim 1, wherein the first plurality of pivot points are further selected based on a bid amount.

10. A system for providing interactive browsable content items, the system comprising:
one or more data processors; and one or more storage devices storing instructions that, when executed by the one or more data processors, cause the one or more data processors to perform operations comprising:
receiving a search query returning a result set identifying a plurality of products, the result set defining an n-dimensional space of the plurality of products;
selecting a first plurality of pivot points based on the n-dimensional space of products, each of the plurality of pivot points corresponding to a product of the n-dimensional space of products, each of the first plurality of pivot points selected based on a dimensional distance within the n-dimensional space of products relative to another pivot point of the first plurality of pivot points;

serving display data indicative of the first plurality of pivot points to be displayed on a display of a client device;

receiving a touch input from the client device selecting a pivot point of the first plurality of pivot points;

selecting a subset of the plurality of products from the n-dimensional space responsive to the selected pivot point;

serving display data indicative of the subset of the plurality of products to be displayed on the display of the client device;

receiving, subsequently to receiving the touch input and subsequently to serving the display data indicative of the subset of the plurality of products, a zoom out touch input from the client device;

selecting, responsive to the zoom out touch input, a second plurality of pivot points based on the subset of the plurality of products and the selected pivot point, the second plurality of pivot points different from the first plurality of pivot points; and serving display data indicative of the second plurality of pivot points to be displayed on the display of the client device.

11. The system of claim 10, wherein the display data indicative of the first plurality of pivot points is displayed in a single slot of a search results page on the display of the client device.

12. The system of claim 10, wherein each of the subset of the plurality of products are selected based on a probability exploration rate, the probability exploration rate indicative of a likelihood of selection by a user based on the search query and the selected pivot point.

13. The system of claim 10, wherein the touch input is a tap touch input.

14. The system of claim 10, wherein the touch input is a zoom in touch input.

15. The system of claim 10, wherein the one or more storage devices stores instructions that, when executed by the one or more processors, cause the one or more processors to perform operations further comprising:
removing the subset of the one or more products from the n-dimensional space of products.

16. A non-transitory computer readable storage device storing instructions that, when executed by one or more processors, cause the one or more processors to perform operations comprising:
receiving a search query returning a result set identifying a plurality of products, the result set defining an n-dimensional space of the plurality of products;
selecting a first plurality of pivot points based on the n-dimensional space of products, each of the plurality of pivot points corresponding to a product of the n-dimensional space of products, each of the first plurality of pivot points selected based on a dimensional distance within the n-dimensional space of products relative to another pivot point of the first plurality of pivot points;
serving display data indicative of the first plurality of pivot points to be displayed on a display of a client device;
receiving a touch input from the client device selecting a pivot point of the first plurality of pivot points;
selecting a subset of the plurality of products from the n-dimensional space responsive to the selected pivot point;

serving display data indicative of the subset of the plurality of products to be displayed on the display of the client device receiving, subsequently to receiving the touch input and subsequently to serving the display data indicative of the subset of the plurality of products, a zoom out touch input from the client device;

selecting, responsive to the zoom out touch input, a second plurality of pivot points based on the subset of the plurality of products and the selected pivot point, the second plurality of pivot points different from the first plurality of pivot points; and serving display data indicative of the second plurality of pivot points to be displayed on the display of the client device.

17. The computer readable storage device of claim 16, wherein the display data indicative of the first plurality of pivot points is displayed in a single slot of a search results page on the display of the client device.

18. The computer readable storage device of claim 16, wherein each of the subset of the plurality of products are selected based on a probability exploration rate, the probability exploration rate indicative of a likelihood of selection by a user based on the search query and the selected pivot point.

19. The computer readable storage device of claim 16 storing instructions that, when executed by one or more processors, cause the one or more processors to perform operations further comprising:

removing the subset of the plurality of products from the n-dimensional space of products.

* * * * *